United States Patent [19]

Melvin

[11] 4,365,615
[45] Dec. 28, 1982

[54] SOLAR HOT WATER HEATER

[76] Inventor: Hubert A. Melvin, Rte. 1, Box 167-A, Tar Heel, N.C. 28392

[21] Appl. No.: 238,435

[22] Filed: Feb. 26, 1981

[51] Int. Cl.³ .............................................. F24J 3/02
[52] U.S. Cl. .................................. 126/419; 126/437; 126/438
[58] Field of Search ............... 126/419, 417, 424, 425, 126/438, 437, 439, 422

[56] References Cited

U.S. PATENT DOCUMENTS

| 629,122 | 7/1899 | Davis | 126/438 |
|---|---|---|---|
| 2,595,905 | 5/1952 | Telkes | 126/419 |
| 4,059,226 | 11/1977 | Atkinson | 126/400 |
| 4,102,329 | 7/1978 | Smith, Jr. | 126/424 |
| 4,127,104 | 11/1978 | Greene | 126/400 |
| 4,172,442 | 10/1979 | Boblitz | 126/419 |
| 4,222,367 | 9/1980 | Jubb | 126/419 |

Primary Examiner—James C. Yeung
Attorney, Agent, or Firm—Harvey B. Jacobson

[57] ABSTRACT

A solar hot water heater includes an insulated box having one or more hot water storage tanks contained inside and further having a lid which may be opened to permit solar radiation to heat a supply of water contained within the one or more hot water storage tanks. A heat-actuated control unit is mounted on an external portion of the box, such control unit having a single pole double throw thermostat which selectively activates an electric winch gear motor to either open or close the box lid. The control unit operates to open the lid to a predetermined position when exposed to the sun's rays, and further operates to immediately close the lid in response to any sudden drop in temperature, such as might occur during a rainstorm, clouds moving in front of the sun, or the like.

10 Claims, 8 Drawing Figures

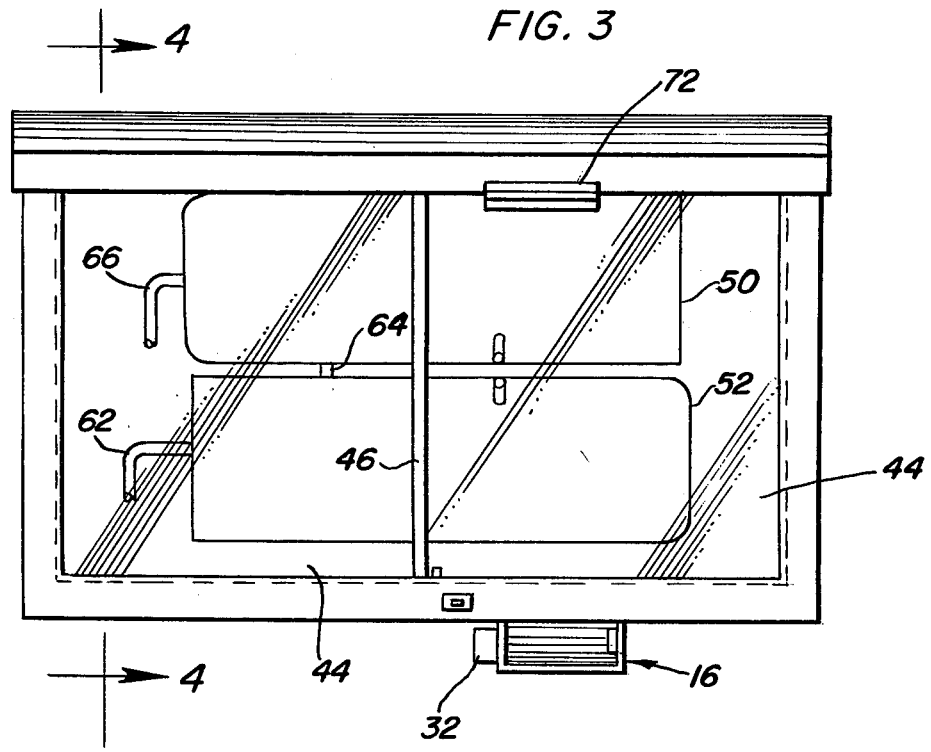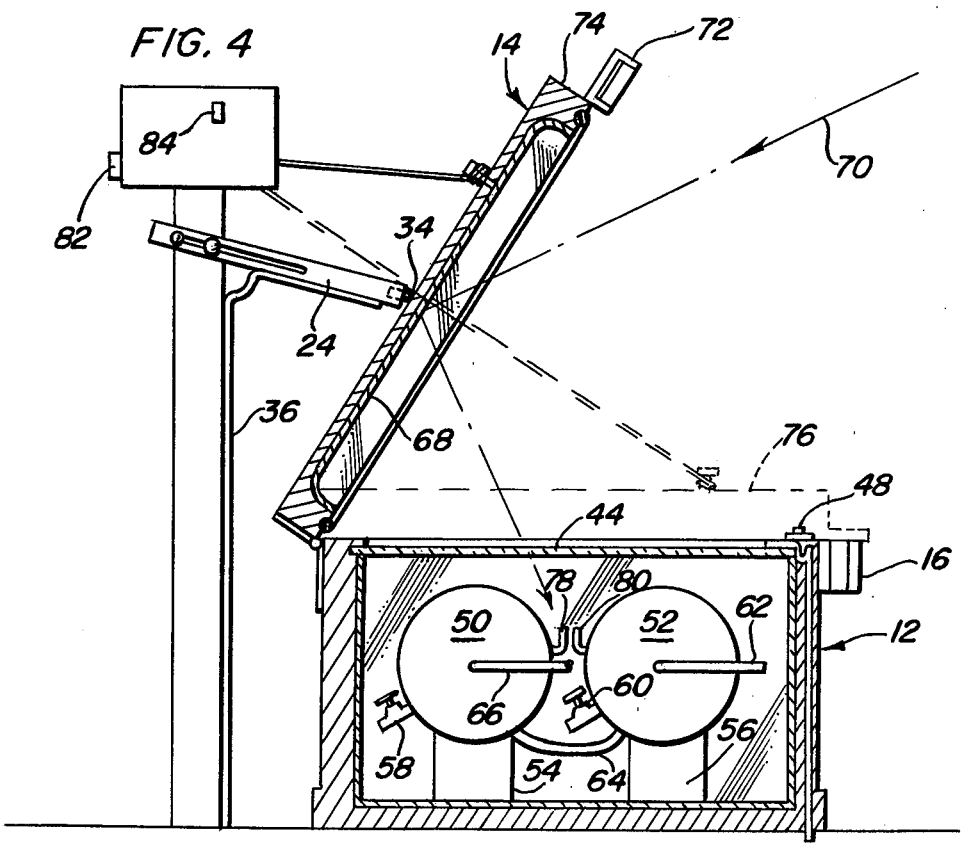

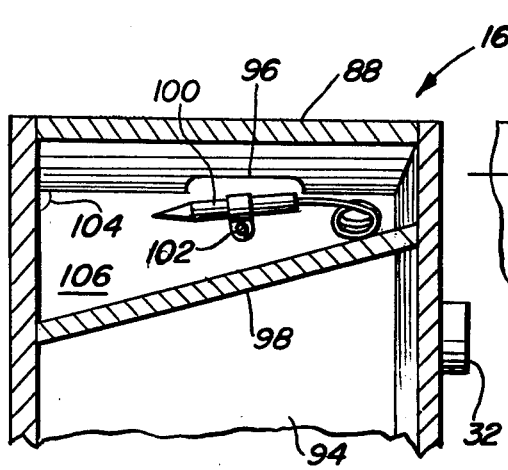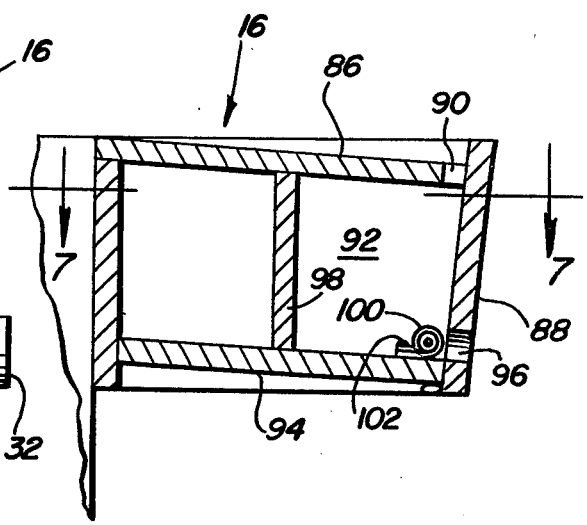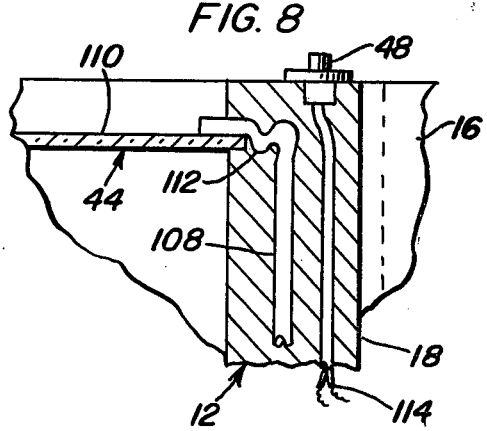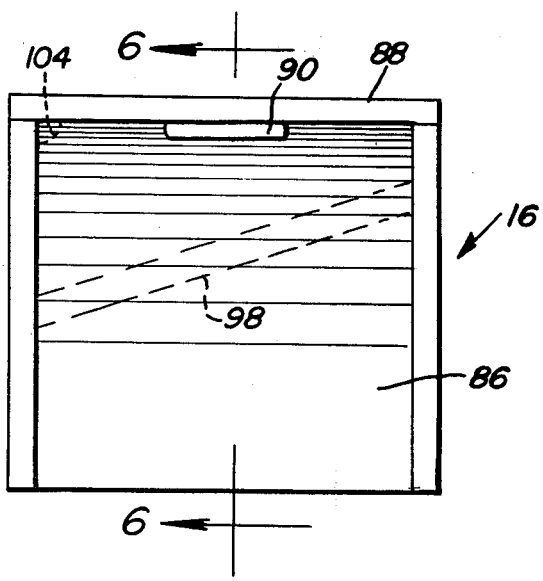

SOLAR HOT WATER HEATER

BACKGROUND OF THE INVENTION

1. Field of the Invention

The present invention relates generally to solar hot water heaters and more particularly pertains to a new and improved solar hot water heaer that will selectively expose a supply of water to the sun's rays in response to a sensed temperature and which will further insulate the water supply from heat loss during such periods of time that a temperature drop is being experienced.

2. Description of the Prior Art

It is well known that the sun's energy can be harnessed through a variety of techniques and for many different purposes. In this respect, the use of the sun's energy to heat hot water is a developing art, and there is a continuing need for new and improved devices which both efficiently and reliably capture the energy of the sun. Typically, these devices have proven to be quite unwieldy and very expensive to install, as well as being very inefficient due to excessive heat loss experienced when a transfer of solar heat from a collector to a removed storage chamber is effected. In this regard, prior art solar hot water heating systems have not been capable of being easily installed proximate to or in existing building structures and have not been devised to cooperate as an auxiliary heating unit with the conventional water heating systems commonly found in building structures.

With respect to the particular structural arrangement of a typical solar hot water heating system, reference is made to U.S. Pat. No. 4,059,226, issued to Atkinson on Nov. 22, 1977, wherein there is disclosed a heat collector and storage chamber which utilizes a solar collector protected by a door positionable over the solar collector elements associated therewith. In this respect, the Atkinson device refers to the door as being electrically operated to open and close the same and further, it is noted therein that the door may have reflective surfaces and be positionable at a desired angle whereby the sun's rays may be reflected onto the solar collecting elements. However, while the concept disclosed in the Atkinson patent is particularly interesting, the means and manner of so positioning the door are not disclosed.

As such, it can be appreciated that there exists a continuing need for new and improved solar hot water heating devices, such as the type disclosed in the patent to Atkinson, and in this regard, it would be particularly useful to have a solar hot water heating apparatus which would automatically expose a supply of water to be heated to the sun's rays when available and which would further protectively insulate the water supply in the event of a temperature drop, such as might occur during a sudden rainstorm, the sun being shaded by clouds, etc. In this respect, the present invention substantially fulfills this need.

SUMMARY OF THE INVENTION

The general purpose of the present invention, which will be discussed subsequently in greater detail, is to provide a solar hot water heater that has all of the advantages of the prior art solar hot water heaters and none of the disadvantages. To attain this, the present invention provides for an insulated box in which one or more water storage tanks may be positioned, such insulated box having a lid portion which may be selectively opened or closed to expose the water storage tanks contained within the box. A heat actuated control unit is provided on an exterior surface of the box, such control unit having a single pole double throw thermostat associated therewith, whereby an electric winch gear motor may be selectively operated to either open or close the lid of the box. Inasmuch as the interior and lid portions of the box are coated with a highly reflective material, at such times that the lid is in an open position, the sun's rays may be caused to reflect off of the reflective surfaces so as to effectively heat the water contained within the one or more water storage tanks.

As can be appreciated, the heat actuated control unit serves as a means of causing the lid to open during a period of sun ray exposure, and to likewise cause the lid to close during such periods of time that the temperature of the surrounding air drops to a point below the temperature of the heated water contained within the box. Specifically, in response to an increased temperature sensed by the heat actuated control unit, the single pole double throw thermostat activates the forward drive of the electric winch gear motor thereby to cause the same to open the lid of the box. The sun's rays may then reflect downwardly from the lid into the box through a sheet of glass positioned thereover which helps to retain heat around the one or more water storage tanks. Additionally, an adjustable lid stop is positioned above the lid whereby the lid may come into contact with the stop during an opening thereof, such stop being provided with a switch on a lid contacting portion thereof which serves to turn off the electric winch gear motor.

In the event of a sudden temperature drop, such as might occur during a rainstorm, the single pole double throw thermostatic switch will again operate to reverse the electric winch gear motor thus to cause the lid to drop into a closed position so as to effectively insulate and protect the heated water supply contained within the box. A further switch is provided on a topmost edge of the box which operates to cut off the power to the electric winch gear motor when the lid has reached its closed position.

Attached to the lid is a cover extending outwardly therefrom which serves to close off a topmost portion of the heat actuated control unit so as to protect a thermostat bulb contained therein from the elements, such cover being positionable over a topmost open portion of the control unit only when the lid is in a closed position. In this respect, when the lid is in an open position, the topmost open portion of the heat actuated control unit permits rain to be directed downwardly therethrough so as to come into contact with the aforementioned thermostat bulb. This feature provides for a quick response of the control unit in the event of a temperature drop associated with a rainstorm, so as to minimize the amount of heat loss from the box due to the surrounding environmental temperature drop.

It is therefore an object of the present invention to provide a solar hot water heater that has all of the advantages of the prior art solar hot water heaters and none of the disadvantages.

Another object of the present invention is to provide a solar hot water heater that is efficient and reliable in its operation.

Yet another object of the present invention is to provide a solar hot water heater that is durable and rugged in its construction.

Still another object of the present invention is to provide a solar hot water heater that may be easily and economically manufactured.

Even another object of the present invention is to provide a solar hot water heater that may be fluidly connected to an existing water supply.

A further object of the present invention is to provide a solar hot water heater that utilizes a unique heat actuated control unit.

Still yet another object of the present invention is to provide a solar hot water heater which utilizes a minimum of moving parts and which is simple in operation.

Yet even another object of the present invention is to provide a solar hot water heater that may be installed at a low initial cost.

Even still another object of the present invention is to provide a solar hot water heater that may be operated at a very minimum cost.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a top plan view of the present invention with the lid associated therewith in an open position.

FIG. 4 is a transverse plan view, partly in cross section, illustrating the constructional details of the present invention, as viewed along line 4—4 of FIG. 3.

FIG. 5 is a top plan view of the heat actuated control unit forming a part of the present invention and having its cover portion removed.

FIG. 6 is a transverse cross-sectional view of the heat actuated control unit taken along the line 6—6 of FIG. 5.

FIG. 7 is a top cross-sectional view of the heat actuated control unit taken along the line 7—7 of FIG. 6.

FIG. 8 is an enlarged detail view, partly in cross section, illustrating the use of a drain line proximate to a topmost edge of the box forming a part of the present invention.

DESCRIPTION OF THE PREFERRED EMBODIMENT

Figure 1:
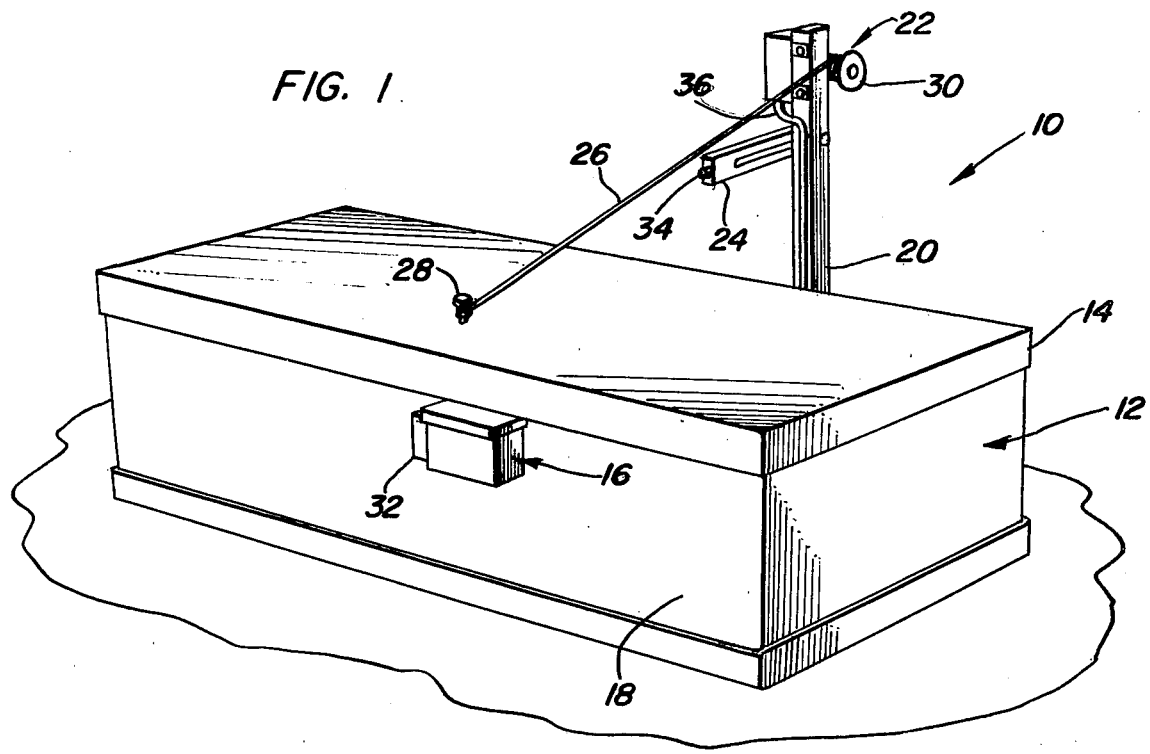
FIG. 1 is a perspective view of the solar hot water heater forming the present invention.

With reference now to the drawings and in particular to FIG. 1 thereof, a solar hot water heater embodying the principles and concepts of the present invention and generally designated by the reference numeral 10 will be described. Specifically, it can be seen that the solar hot water heater 10 includes an insulated box 12 having a lid 14 hingedly attached thereto, and further having a heat actuated control unit 16 operably mounted on a front wall 18 forming a part thereof. Additionally, a support beam 20 is positioned behind the box 12, such support beam having an electric winch gear motor 22 operably attached to a topmost portion thereof and further having an adjustable lid stop arm 24 fixedly secured proximate to the electric winch gear motor. As illustrated, the electric winch gear motor 22 is operably attached to the lid 14 by means of a cable 26 fixedly secured to the lid by conventional attachment means, such as a screw 28, or the like, and further being rotatably positioned around a gear motor pulley 30 operably associated with the electric winch gear motor 22.

Further illustrated in FIG. 1 is a single pole, double throw thermostatic switch 32 fixedly secured to a side portion of the heat actuated control unit 16, and a switch 34 operably mounted on an end portion of the adjustable lid stop 24, such switch serving as a means to cut off the power to the electric winch gear motor 22 as supplied through an electrical power lead contained in the conduit 36.

Figure 2:
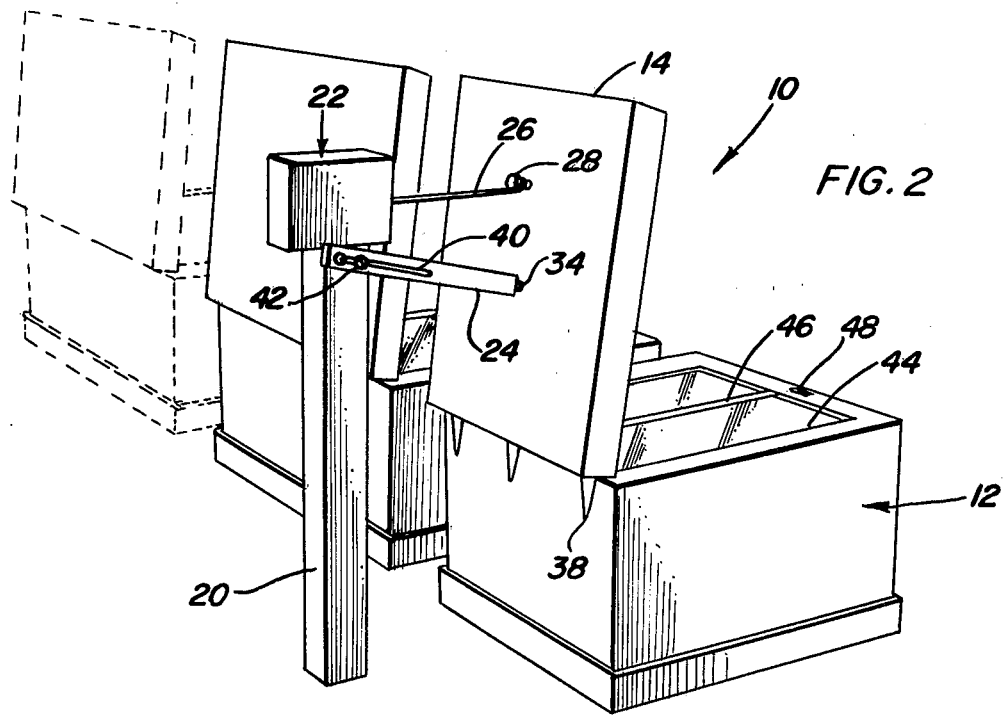
FIG. 2 is another perspective view illustrating a plurality of the solar hot water heaters forming the present invention being in position to operably receive energy from the sun.

While the solar hot water heater 10 forming the present invention has been illustrated in FIG. 1 with its lid 14 in a closed position, FIG. 2 illustrates a plurality of the solar hot water heaters 10 forming the present invention, each of which has its lid 14 in an open position whereby the sun's rays may be directed into an interior portion thereof. Specifically, it can be seen that a lid 14 is normally hingedly attached to a box 12 through the use of a plurality of conventional hinges 38 connected between the respective lid and box. Additionally, FIG. 2 serves to illustrate the fact that a winding of the cable 26 upon the gear motor pulley 30 will effect the desired lifting of a lid 14 into an open position. Further clearly illustrated in FIG. 2 is the fact that the lid stop 24 is adjustably mounted to the support beam 20 through the use of a longitudinally extending slot 40 positioned within the lid stop 24, such slot serving to facilitate the attachment of the lid stop to the beam through the fixed securing of one or more screws 42 through the slot and into the structure of the beam per se. Further, it can be seen that the lid 14 is limited in its movement into an open position by coming into contact with an extending end of the lid stop 24, whereby the switch 34 is brought into an abutting contact with the lid. In this regard, the switch 34 serves to cut off the electric power to the electric winch gear motor 22 so as to cause a cessation in the winding of the cable 26 about the gear motor pulley 30, thereby to prevent any further opening of the lid. Also partially evident in FIG. 2 is the fact that the respective solar hot water heaters 10 have hollow interior portions which are substantially sealed from an external environment through the use of sheets of glass 44, or some similar transparent material. If desired, a cross extending support member 46 may be utilized to give added support to the panes of glass 44 positioned over a topmost portion of the box 12, while a switch 48 may be operably positioned on an edge portion of the box, such switch serving to turn off the electric power to the electric winch gear motor 22 once the lid 14 has moved into a closed position.

FIG. 3, which is a top plan view of the present invention, illustrates the use of two hot water storage tanks 50, 52 within the interior of the box 12, such hot water storage tanks typically consisting of no more than conventional hot water heaters from which the normal covering insulation has been removed. Additionally, the hot water storage tanks 50, 52 may be painted black so as to facilitate a rapid heat absorption during their exposure to solar radiation. As can be appreciated with reference to FIG. 4 concurrently with FIG. 3, the hot water storage tanks 50, 52 may be respectively supported within the box 12 through the use of any type of weight bearing supports 54, 56. Further, it can be seen that the respective hot water storage tanks 50, 52 may be provided with drains 58, 60 so as to permit a removal of water therefrom in the event that it is desired to remove the tanks or to perform some other operation thereon. Also illustrated is a first conduit 62 directed to the hot water storage tank 52, such first conduit 62 being directed to an exterior portion of the box 12 in a conventional manner and serving to provide a supply of cold water to the hot water storage tank 52 from some external supply. In this respect, it is envisioned that the conduit 62 would be fluidly connected within the water supply system of a typical dwelling. By the same token, a cross over conduit 64 may be fluidly connected between the two hot water storage tanks 50, 52 whereby water flow from the tank 52 to the tank 50 will be permitted. A second conduit 66 is shown directed out of the hot water storage tank 50, such second conduit serving as an outlet for heated water from the tank and also being in fluid communication with a conventional water supply system of a dwelling. In this regard, it can be appreciated that a supply of water normally provided to a dwelling might first be directed through the solar hot water heater 10 through the use of the respective inlet and outlet conduits 62, 66 thereby to provide heating to the water supply prior to its delivery to the dwelling.

With further reference to FIGS. 3 and 4 concurrently, it can be seen that the aforementioned glass panels 44 serve to seal an interior portion of the box 12 so as to effectively capture and retain heat generated by solar radiation therein. In this connection, the glass panels 44 could be of a unitary or single construction, i.e., only one panel need be used to cover the entire top portion of the box 12, or alternatively, two panels might be used with a center support strip 46 as illustrated. In this regard, a single glass panel 44 might be used in combination with the center support strip 46 also, thus making it obvious that any number of support strips and glass panels might be utilized to efficiently and reliably seal the top of the box 12.

With particular reference to FIG. 4 of the drawings, it can be seen that the lid 14 includes an inner smooth reflective surface 68, which typically might be constructed from glueing aluminum foil to a cavity positioned within the lid. Similarly, the respective interior side walls and bottom of the box 12 per se may also be provided with a tin foil or otherwise reflective covering to facilitate maximum reflection of the sun's rays about the respective hot water storage tanks 50, 52. In this regard, it can be seen that the lid 14 may be selectively positioned through a proper locating of the adjustable lid stop 24 in a manner which assures optimum reflection of the sun's rays, as illustrated by the reference numeral 70. Additionally illustrated in FIG. 4 is the fact that heat actuated control unit 16 includes a thermostat box cover or lid 72 attached to a front portion 74 of the lid 14. In this connection, the thermostat box cover 72 will normally cover the top of the heat actuated control unit 16 when the lid 14 is closed, as illustrated by phantom lines 76, and will be removed from the top of the heat actuated control unit at such time that the lid 14 is moved into an open position as shown in FIG. 4.

Other novel features of the present invention illustrated in FIG. 4 include the use of a pair of safety relief valves 78, 80 respectively located on the hot water storage tanks 50, 52, such relief valves serving to guard against a dangerous pressure buildup within the respective storage tanks which might otherwise cause a rupturing thereof. Further, a conventional circuit overload breaker 82 is illustrated in operable connection with the electric winch gear motor 22, as is a manual reversing switch 84, also conventionally a part of such a gear motor. FIG. 4 further serves to illustrate the operable positioning of the respective cutoff switches 34, 48, which serve to control the power supplied to the electric winch gear motor 22 in the manner above described.

As to the particular construction of the heat actuated control unit 16, reference is made to FIGS. 5 and 6 of the drawings wherein the control unit is illustrated with the box cover 72 operably removed therefrom. In this regard, it can be seen that the control unit 16 includes a downwardly sloped, topmost surface member 86, such surface member being downwardly sloped towards a front wall 88 forming a part of the heat actuated control unit 16 and having a through extending aperture 90 positioned therein proximate to the front wall 88. In this respect, the aperture 90 serves as a means of access to an interior portion 92 which is defined by the interior side walls of the control unit, as well as a forwardly downwardly sloped bottom member 94.

FIG. 7 illustrates further details of the interior construction of the heat actuated control unit 16 wherein it can be seen that the front wall 88 is provided with a slight backward slope, as also clearly illustrated in FIG. 6, and further includes a through-extending aperture 96 which serves as a means of communication between an external environmental and the interior 92 of the control unit. By the same token, a vertically extending wall 98 is illustrated, such wall cooperating with the respective side walls of the control unit, to substantially direct a flow of rain water into contact with a thermostat bulb 100 operably and fixedly secured to the bottom 94 by conventional attachment means, such as the screw and clamp arrangement 102. Finally, FIG. 7 illustrates the positioning of a drain hole 104 on a remote corner of the bottom 94, it being understood that the floor 94 might also be leftwardly downwardly sloped, as well as forwardly downwardly sloped, whereby all water captured within a forward chamber portion 106 of the control unit 16 would flow outwardly therefrom through the drain hole 104. Of course, the thermostat bulb 100 forms a part of the aforementioned single pole double throw thermostatic switch 32 operably and fixedly secured to a side portion of the control unit 16. As is evident with reference to FIG. 5, when the box cover 72 is removed from the heat actuated control unit 16, as when the lid 14 is in an open position, a sudden rainstorm will result in raindrops accumulating on the surface member 86 and flowing downwardly thereon through the aperture 90 into contact with the thermostat bulb 100, so as to effect a desired closing of the lid in the above-described manner.

FIG. 8 illustrates another novel feature of the present invention which essentially consists of a small drain line 108 operably positioned within the front wall 18 of the box 12, such drain line being in fluid communication with a surface area 110 associated with the glass panels 44. Specifically, it can be recognized that a sudden rainstorm will produce an accumulation of water on the surface area 110 of the glass panels 44 prior to a closing of the lid 14, and the drain line 108 serves as the means for facilitating a removal of the water from the glass panel surface 110. Inasmuch as the drain line would possibly serve as a conduit for warmed air to flow outwardly from the box 12 to an external environment, a small U-trap 112 is provided in the drain line 108, whereby water may accumulate within the trap in a known manner to prevent a flow of heated air through the drain line. FIG. 8 also serves to illustrate the positioning of the switch 48 in the front wall 18 of the box 12, with the power supply lead 114 being directed therefrom to the aforementioned electric winch gear motor 22.

With respect to the operation of the solar hot water heater 10, it can be appreciated that the same may be fluidly connected within an existing water supply system associated with a dwelling or the like and further should be positioned in a location having maximum exposure to the sun's rays. With particular reference to FIG. 1 of the drawings, wherein the solar hot water heater 10 is illustrated with its lid 14 in a closed position, it can be seen that an exposure of solar radiation will cause a rise in temperature to be experienced by the heat actuated control unit 16. This rise in temperature, of course, causes the single pole double throw thermostatic switch 32 to activate the electric winch gear motor 22 so as to cause the cable 26 to lift the lid 14 into an open position. With reference to FIG. 4 of the drawings, it will be noted that the lid 14 will open until such time as it comes into contact with the switch 34 as positioned on the end of the adjustable lid stop 24, such switch serving to turn off the electric winch gear motor 22.

With the lid then open, the sun's rays 70 may be reflected off of the shiny surface 68 formed on the interior portion of the lid 14, so as to heat a supply of water contained in the hot water storage tanks 50, 52. In the event that there is a sudden drop in temperature, such as might occur when the sun goes behind a cloud or when a rainstorm begins, such temperature drop will be detected by the thermostat bulb 100, either by air flowing through the aperture 96 contained in a front wall 88 of the heat actuated control unit 16, or by rain running down the surface member 86 and dropping through the aperture 90 into direct contact with the thermostat bulb. The single pole double throw thermostatic switch 32 then actuates the reverse drive of the electric winch gear motor 22 so as to cause a reverse operation of the gear motor pulley 30, thus to lower the lid 14 into a closed position. Once the lid has moved into a substantially closed position, the same will actuate the switch 48 which operates to turn off the electric winch gear motor 22 in the above-described manner. Simultaneously, the closing of the lid 14 causes the thermostat box cover 72 to close off the topmost portion of the heat actuated control unit 16, while any excess water which might accumulate on a top surface area 110 of the glass panels 44 will drain therefrom through drain line 108. Inasmuch as the box is heavily insulated, the closing of the lid 14 serves to prevent any heat loss from the hot water storage tanks 50, 52 in response to an outside drop in temperature.

In a typical embodiment of the present invention, the heat actuated control unit 16 would utilize a rectangularly-shaped box approximately 12 inches long, 8 inches high and 4 inches wide. The backside, bottom and westwardly-directed side of the box should be heavily insulated, while the top, eastwardly-directed side and southwardly-directed side could be painted black. Since the outside southwardly-directed side of the unit's box is painted black, the thermostat bulb 100 positioned therein will react more quickly to solar radiation exposure. The installation on those portions of the unit box not exposed to direct solar radiation further controls the thermostat response rate to environmental temperature changes.

With respect to the above description, it is to be understood that the optimum dimensional relationships for the parts of the invention are deemed obvious to one of ordinary skill in the art and that all equivalent relationships, to include changes in size, shape, function and manner of operation, are intended to be encompassed by the invention as described in the recited claims.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solar hot water heater comprising:
    water storage means including at least one hot water storage tank in fluid communication with inlet and outlet water supply lines;
    container means having said water storage means contained therein;
    lid means supported by said container means and being operable to expose said water storage means to solar radiation when open and to limit heat loss from said water storage means when closed;
    control means including motor means and responsive to environmental temperature changes and operable for the motor means to open and close said lid means; and
    reflection means provided on said lid means to facilitate a reflection of said solar radiation against said water storage means; said control means further including a thermostat means disposed within a space adjacent said container means and coverable by said lid means and for sensing said environmental temperature changes; said thermostat means being operable to effect selectively a forward and reverse operation of said motor means so as to respectively open and close said lid means.

2. The solar hot water heater as defined in claim 1, wherein said thermostat means includes a single pole double throw thermostatic switch to effect said forward and reverse operation of said motor means.

3. The solar hot water heater as defined in claim 2, and including further switch means to operably turn off said motor means when said lid means reaches either an open or closed position.

4. The solar hot water heater as defined in claim 1, wherein said container means includes the use of a large box, said at least one hot water storage tank being substantially completely contained within said box.

5. The solar hot water heater as defined in claim 4, and further wherein a topmost open portion of said box is covered by a sheet of transparent material so as to facilitate a retention of heat within said box without effecting an exposure to solar radiation of said water storage means.

6. A heat actuated control unit for use in combination with a solar hot water heater, said control unit being operable to control an exposure of a water storage means to solar radiation when such solar radiation is available and to further effect an insulating of said water storage means to prevent a heat loss therefrom when said solar radiation is unavailable, said heat actuated control unit including:
    thermostat means operable to control a motor means utilizable to effect said water storage means exposure to or insulation from a surrounding environment;

housing means in which said thermostat means may be operably positioned; and temperature control means for effecting a rapid activation of said thermostat means in response to environmental temperature changes, said temperature control means including a surface means having an aperture extending therethrough, said aperture serving to direct rain water to said thermostat means to thus cause a sensing by said thermostat means of a rapid environmental temperature drop normally associated with a rainstorm, so as to activate said motor means.

7. The solar hot water heater as defined in claim 6, wherein reflection means are provided on a lid means to facilitate a reflection of said solar radiation against said water storage means.

8. The solar hot water heater as defined in claim 7, wherein said control unit includes motor means operable t open and close said lid means.

9. The solar hot water heater as defined in claim 8, wherein said thermostat means is operable to effect a forward and reverse operation of said motor means so as to respectively open and close said lid means.

10. The solar hot water heater as defined in claim 6, wherein said water storage means includes at least one hot water storage tank in fluid communication with inlet and outlet water supply lines.

* * * * *